(12) United States Patent
Seremet et al.

(10) Patent No.: US 11,540,138 B2
(45) Date of Patent: Dec. 27, 2022

(54) INTERACTIVE LOCAL INFORMATION INTERFACE

(71) Applicant: Sensormatic Electronics, LLC, Boca Raton, FL (US)

(72) Inventors: Ervin Seremet, Boca Raton, FL (US); Juan Miguel Camarasa, Boca Raton, FL (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 249 days.

(21) Appl. No.: 16/906,308

(22) Filed: Jun. 19, 2020

(65) Prior Publication Data
US 2021/0400469 A1    Dec. 23, 2021

(51) Int. Cl.
*H04W 12/63* (2021.01)
*H04L 12/28* (2006.01)
*G07C 9/28* (2020.01)

(52) U.S. Cl.
CPC .............. *H04W 12/63* (2021.01); *G07C 9/28* (2020.01); *H04L 12/283* (2013.01)

(58) Field of Classification Search
CPC ......... H04W 12/63; G07C 9/28; H04L 12/283
See application file for complete search history.

(56) References Cited

U.S. PATENT DOCUMENTS

| 2016/0328600 A1* | 11/2016 | Che ................... G06V 40/1365 |
| 2020/0233680 A1* | 7/2020 | Ma ......................... G06Q 10/10 |
| 2021/0168556 A1* | 6/2021 | Park ...................... H04W 4/025 |

\* cited by examiner

*Primary Examiner* — Duc C Ho
(74) *Attorney, Agent, or Firm* — ArentFox Schiff LLP (57) ABSTRACT

Example implementations include a method, apparatus and computer-readable medium for managing and communicating local information of an area, comprising receiving a user identification information of a user in the area. The implementations further include determining a user identification of the user based on the user identification information. Additionally, the implementations further include obtaining a first information based on the user identification, wherein the first information comprises a first set of local information associated with the area. Additionally, the implementations further include instructing display of the first information. Additionally, the implementations further include receiving a user input from the user in response to the first information. Additionally, the implementations further include instructing display of a second information based on the user identification and the user input, wherein the second information comprises a second set of local information of the area based on at least one local device and the user input.

23 Claims, 10 Drawing Sheets

INTERACTIVE LOCAL INFORMATION INTERFACE

TECHNICAL FIELD

The described aspects relate to managing and communicating local information of an area and specifically to an interactive interface for managing and communicating local information of an area to a user based on a user identification.

BACKGROUND

In the context of managing access control, communications and navigation of large areas or building, communicating hyper-local information, for example, floor plans, a building information modeling (BIM) model of a building, occupancy counts of the building, a list of hazardous materials list, closed-circuit television (CCTV) footage, security and fire detection assets location, etc., may need to be interactively communicated to one or more persons accessing the building or area.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of managing and communicating local information of an area. The method includes receiving a user identification information of a user in the area. The method further includes determining, at a management server, a user identification of the user based on the user identification information. Additionally, the method further includes obtaining a first information based on the user identification, wherein the first information comprises a first set of local information associated with the area. Additionally, the method further includes instructing display of the first information. Additionally, the method further includes receiving a user input from the user in response to the first information. Additionally, the method further includes instructing display of a second information based on the user identification and the user input, wherein the second information comprises a second set of local information of the area based on at least one local device and the user input.

Another example implementation includes an apparatus for managing and communicating local information of an area, comprising of memory and a processor in communication with the memory. The processor is configured to determine a user identification of the user based on user identification information. The processor is further configured to obtain a first information based on the user identification, wherein the first information comprises a first set of local information associated with the area. Additionally, the processor further configured to instruct display of the first information. Additionally, the processor further configured to instruct display of a second information based on the user identification and a user input, wherein the second information comprises local information of the area based on at least one local device and the user input.

Another example implementation includes an apparatus for managing and communicating local information of an area, comprising means for receiving a user identification information of a user in the area. The apparatus further includes means for determining a user identification of the user based on the user identification information. Additionally, the apparatus further includes means for obtaining a first information based on the user identification, wherein the first information comprises a first set of local information associated with the area. Additionally, the apparatus further includes means instructing display of the first information. Additionally, the apparatus further includes means for receiving a user input from the user in response to the first information. Additionally, the apparatus further includes means for instructing display of a second information based on the user identification and the user input, wherein the second information comprises a second set of local information of the area based on at least one local device and the user input.

Another example implementation includes a computer-readable medium computer-readable medium comprising stored instructions for managing and communicating local information of an area, executable by a processor to receive a user identification information of a user in the area. The instructions are further executable to determine a user identification of the user based on the user identification information. Additionally, the instructions are further executable to obtain a first information based on the user identification, wherein the first information comprises a first set of local information associated with the area. Additionally, the instructions are further executable to instruct display of the first information. Additionally, the instructions are further executable to receive a user input from the user in response to the first information. Additionally, the instructions are further executable to instruct display of a second information based on the user identification and the user input, wherein the second information comprises a second set of local information of the area based on at least one local device and the user input.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The method, apparatus and computer readable medium of the present application may manage and communicate local information of an area from a management server to a user via an interactive user interface device that may be placed adjacent to the area. The management server may use assets data collected from one or more sources such as sensors, security cameras, etc., to provide enhanced navigation, communication, and access control services for one or more class of users accessing the area.

Emerging smart building environments, may facilitate collection of a considerable amount of data from assets for various services and data analysis. This data may be stored as a master data record. The stored data may be collected and used by different services and systems. The data may also be used as real-time data and presented locally to a person accessing the building for quick and efficient building management. Moreover, the person may explore building room topology by accessing building information modeling (BIM) models and exploring assets capabilities via the user interface device, thereby experiencing a true smart building environment. The management server may use the already collected asset data stored in a secured digital storage to provide enhanced navigation, communication, and access control service for persons accessing the building. The user interface device may act as a mediator between the building management control and persons accessing the building. Leveraging and communicating the collected assets data in a form of hyper-local information may allow users to engage with building assets and other internet of things (IoT) located in the building. Further, the management server may control access to the building and rooms and provide a navigation system to the people accessing the building via the user interface device. Connecting a building with users in this manner may enable exposing and exploiting smart building capabilities for the users.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Figure 1:
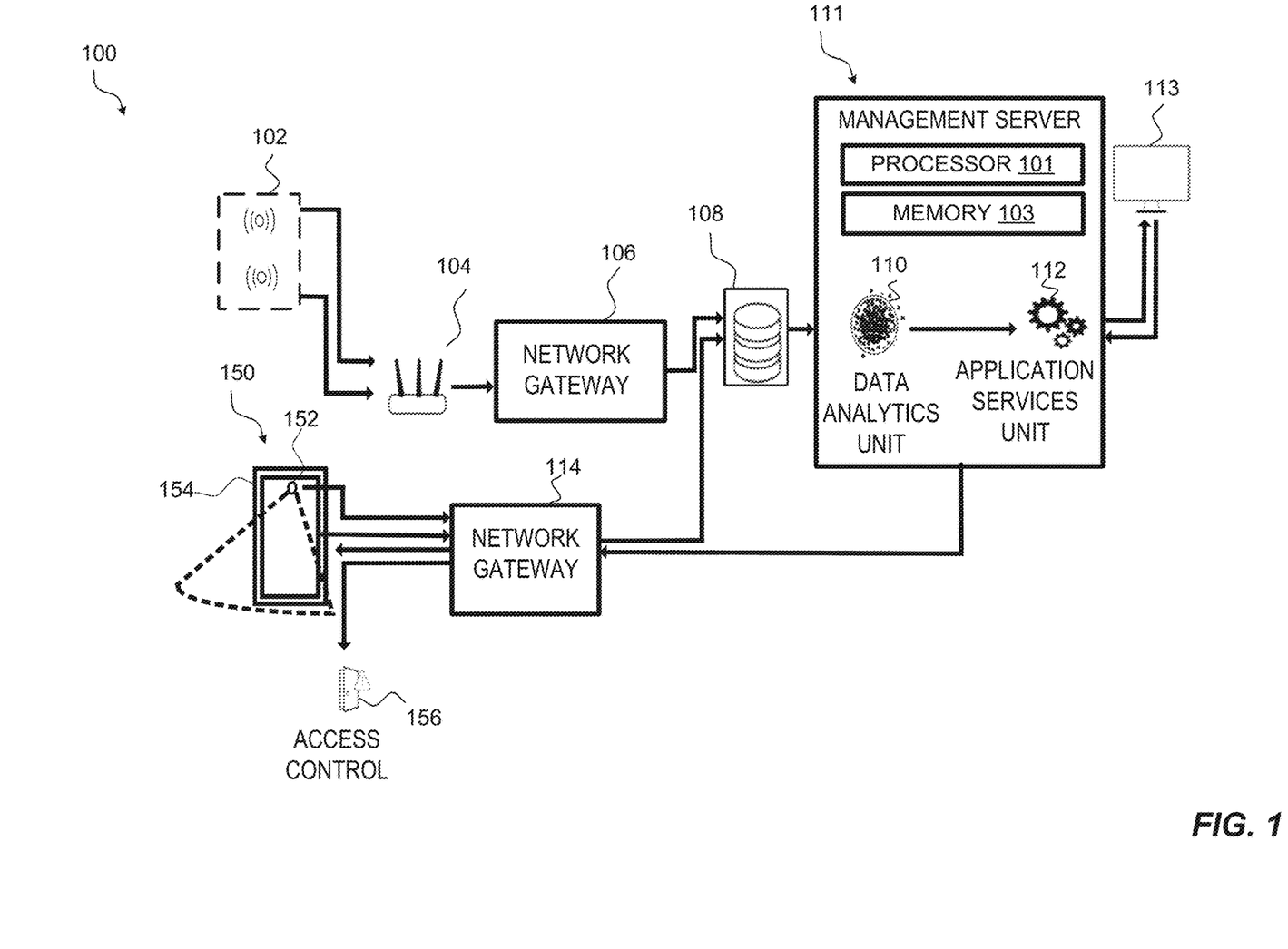
FIG. 1 is a system architecture diagram of an interactive local information interface.

Referring to FIG. 1, a system architecture diagram 100 for an interactive local information interface includes sensors 102 which may be one or more type of sensors including light sensors, sound sensors, temperature sensors, pressure sensors, etc. distributed at several locations of an area served by the interactive local information interface. The sensors 102 are connected to a wired or wireless router 104. The sensors 102 capture and transmit readings for different parameters (e.g., luminous intensity, sound, temperature, pressure, etc.) via the router 104 to a network gateway 106. The network gateway 106 is interfaced to a data storage 108 where the data captured by the sensors 102 may be stored. The data storage 108 may be interfaced to a management server 111 which may include one or more components for implementing the interactive local information interface. The management server 111 may include a processor 101, a memory 103, a data analytics unit 110 and an application services unit 112. The data analytics unit 110 may include one or more programs which the processor 101 may execute to process the data stored at the data storage 108. For example, the processor 101 may execute programs at the data analytics unit 110 to perform checks on the data stored in the data storage 108 (e.g., a check for temperature being above a threshold value, a check for verifying user identification against a set of user identifiers stored in the data storage 108, etc.). The application services unit 112 may include one or more programs that the processor 101 may execute to serve one or more applications for receiving an input from a user (e.g., a person accessing the area) and for displaying information on a user interface device 150.

The user interface device 150 may include a touchscreen 154 for receiving input from a user and displaying information received from the management server 111 to the user. The user interface device 150 may also include a user identification device 152 for identifying the user and capturing one or more user identifiers. In one example, the user identification device 152 may be a camera that captures user's photo for a facial recognition identification technique. In another example, the user identification device 152 may be a radio frequency identification (RFID) device or a bar code reader device that captures a user's unique identifier. The touchscreen 154 and the user identification device 152 may be connected to a network gateway 114 that serves as an interface to the data storage 108 and the management server 111. For example, the user identification device 152 may capture the one or more user identifiers and send the captured user identifiers to the management server 111 via the network gateway 114. The user identification device 152 may also store the one or more user identifiers at the data storage 108 via the network gateway 114. The touchscreen 154 may receive user input (e.g., a selection/data input on the touchscreen) and send the user input to the management server 111 via the network gateway 114. The touchscreen 154 may also receive instructions for displaying information from the management server 111 via the network gateway 114. In some implementations, the user interface device 150 may include an audio input device(s) (e.g., a microphone) to receive identification information (e.g., voice recognition) or output, and an audio output device(s) (e.g., a speaker) to provide instructions/information.

An access control 156 may also be connected to the management server 111 via the network gateway. The access control 156 may selectively allow a user to access the area based on receiving one or more instructions from the management server 111.

The management server 111 may also be connected to a building management system 113 which may allow an administrator (e.g., an authorized user) to perform one or more management operations on the management server 111. For example, the building management system 113 may allow the administrator to monitor the functioning of the management server 111, modify one or more programs in the data analytics unit 110 and the application services unit 112, interrupt/override any operation performed by the management server 111, etc.

The management server 111 allows managing and communicating local information of the area by receiving information from the user interface device 150 and sending instructions to the user interface device 150 (as described below with reference to FIGS. 2-9). Also, the system architecture diagram 100 is not limited to having only one user interface device 150 and two network gateways. Multiple user interface devices (similar to the user interface device 150) and network gateways (similar to the network gateway 114 and/or the network gateway 106) as needed for connecting one or more devices in the system architecture) may be included for supporting access for multiple users to the interactive local information interface.

Figure 2:
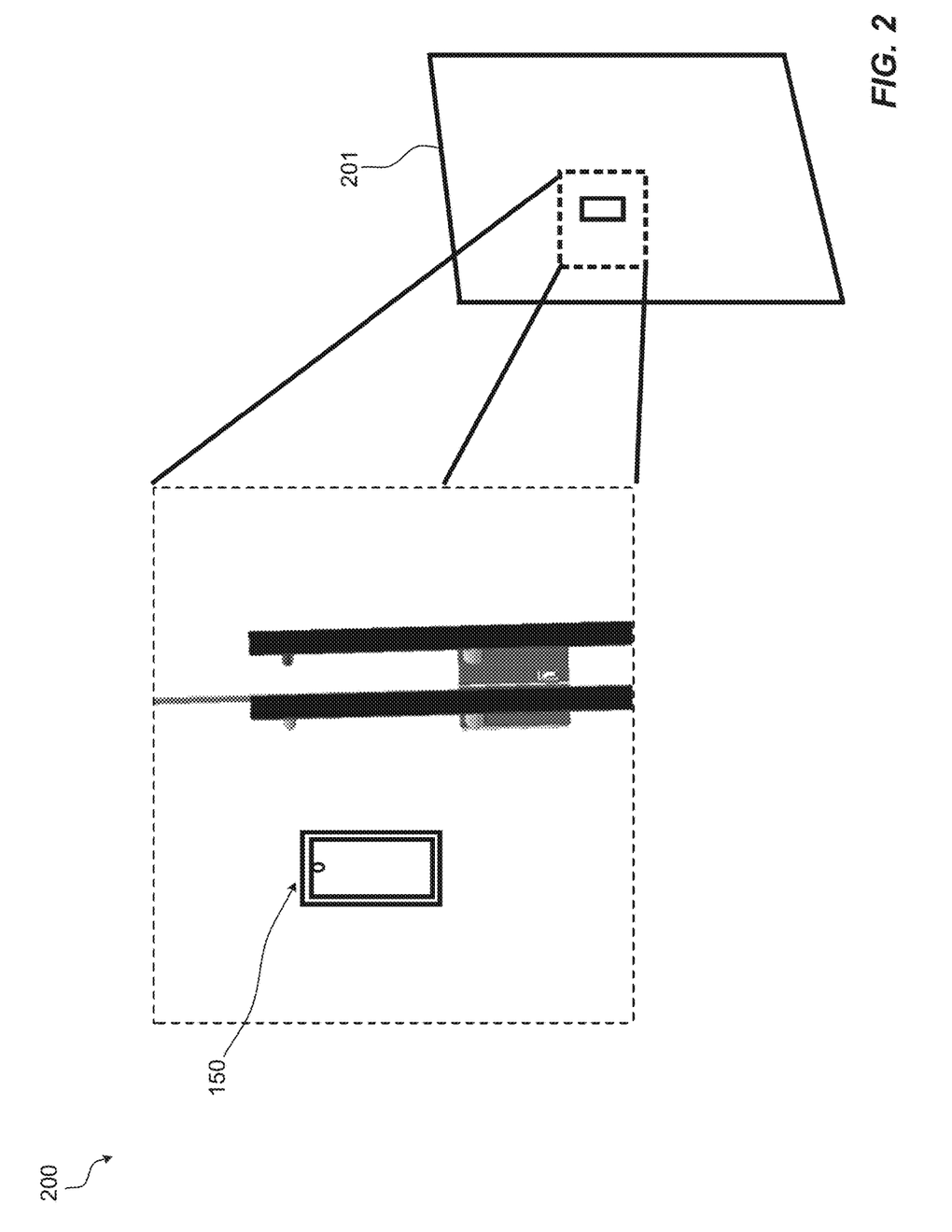
FIG. 2 is a schematic diagram of a user interface device mounted adjacent to an area for managing and communicating local information of the area.

Referring to FIG. 2, a schematic diagram 200 shows the user interface device 150 (as described above with reference to FIG. 1) mounted adjacent to an area for managing and communicating local information of the area. In one implementation, the user interface device 150 may be mounted on a door 201 for entering the area, or on a wall adjacent to a door. Such a position of the user interface device 150 may allow a user to see information displayed on the touchscreen 154 of the user interface device 150 as the user approaches the door. This position may especially be effective when the user interface device 150 acts as an access control device (as described below in FIGS. 3-5).

The dimensions of the user interface device 150 may be similar to, but is not limited to, an A4 size paper (e.g., 8.27×11.69×0.8 inch) to effectively communicate real-time information tailored to the user. In one implementation, when a user is at approximate threshold distance to the door 201, a facial recognition camera (e.g., the user identification device 152) may capture an image of the user and send the image to the management server 111. The processor 101 executing a program stored in the data analytics unit 110 may identify the user based on the user's image and the processor 101 may execute a program stored in the application services unit 112 to instruct display of relevant information to the user based on the user's identification (as described below in FIGS. 3-5). In another implementation, on identifying an authorised maintenance personnel or security personnel for the area, the processor 101 may instruct the touchscreen 154 to present a different interface allowing the personnel to engage with the assets of the area presented on the touchscreen 154 (as described below with reference to FIGS. 6-8). Such an engagement of the personnel may allow them to explore and investigate asset data locally at the user interface device 150.

For users accessing the area, the user interface device 150 may serve as an access control gateway and communication device to display environmental data for the area such as temperature, humidity, occupancy count, floor plan building information model (BIM) (e.g., for a building) and a hazardous material list (e.g., for a lab). Further, the user interface device 150 may also be used to display emergency exit signs in an event of emergency (e.g., based on detecting a fire in the area) to direct an evacuation of the area. Further, the user interface device 150 may be integrated with a biometric access control (e.g., retina scan) and facial recognition to identify a user approaching the area. On detecting and identifying the user, the user interface device 150 may display a welcome message as well as the data relevant to that user. If a user is not familiar with the building, the device then serves as a navigation device by communicating directions to the desired location via the data-enabled display as is seen on the figure above. The device also acts as a navigation device by communicating direction to an unfamiliar user by displaying pictorial signs, similar to the satellite navigation in a car and/or by outputting audio directions.

Figure 3:
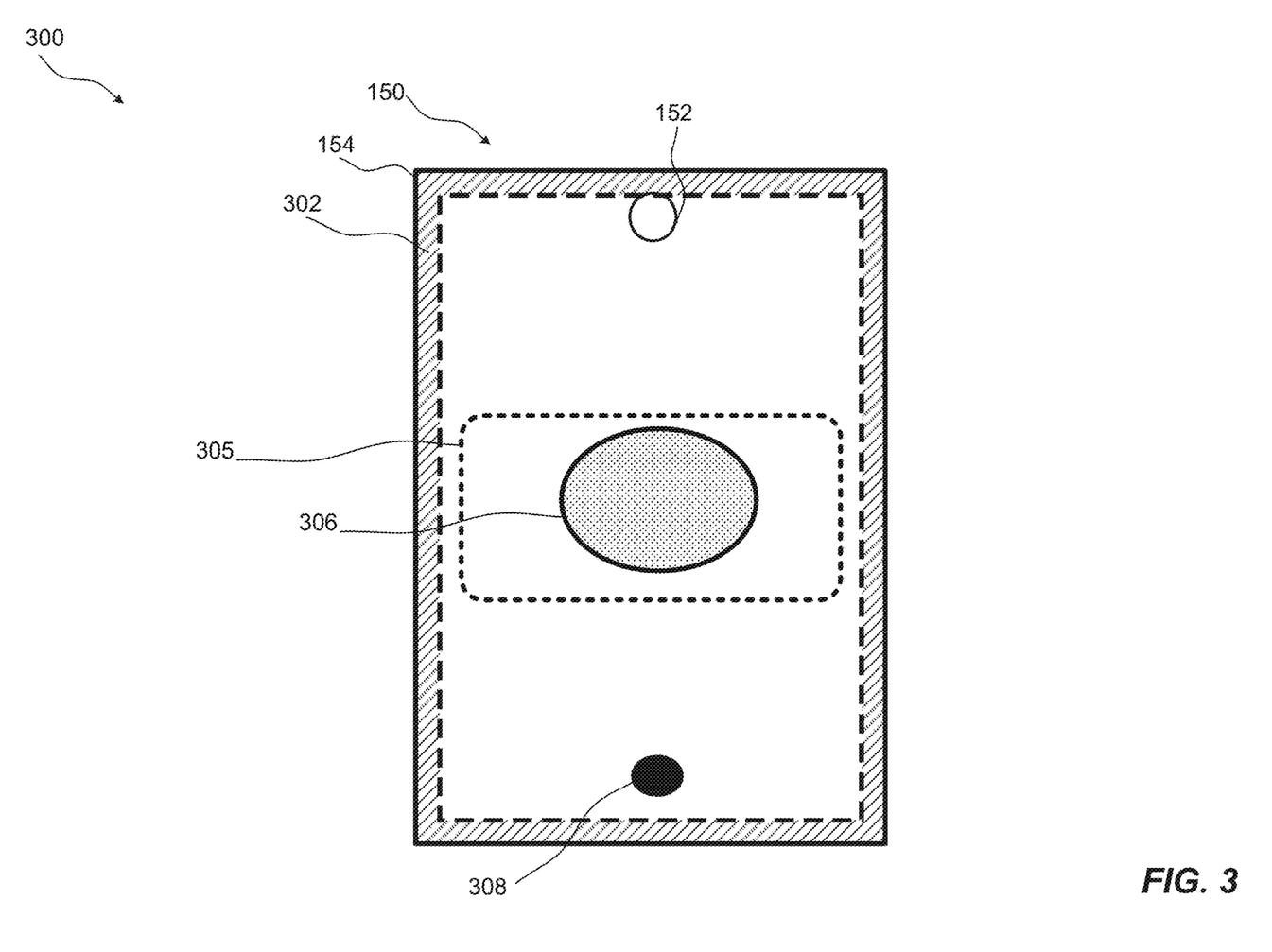
FIG. 3 is a diagram of the user interface device displaying a generic graphical user interface.

Referring to FIG. 3, diagram 300 shows the user interface device 150 (as described above with reference to FIGS. 1 and 2) displaying a generic graphical user interface 302. The generic graphical user interface 302 includes a display region 305 displaying an image 306 (e.g., a logo of an organization) and an input interface 308. The generic graphical user interface 302 may be a graphical user interface before a user input is received at the user interface device 150, or a user identification is determined based on the input from the user identification device 152. A user may begin interaction with the user interface device 150 by an input (e.g., a touch) at the input interface 308. In one implementation, the generic graphical user interface 302 may be a default display that is displayed at the user identification device 152 in a standby mode. The user may specify on the input interface 308 to retrieve detailed information of a subset of the area based on a user selection, location of the subset of the area relative to the user, and/or environmental data of the subset of the area including one or more of temperature, humidity, or occupancy count.

Figure 4:
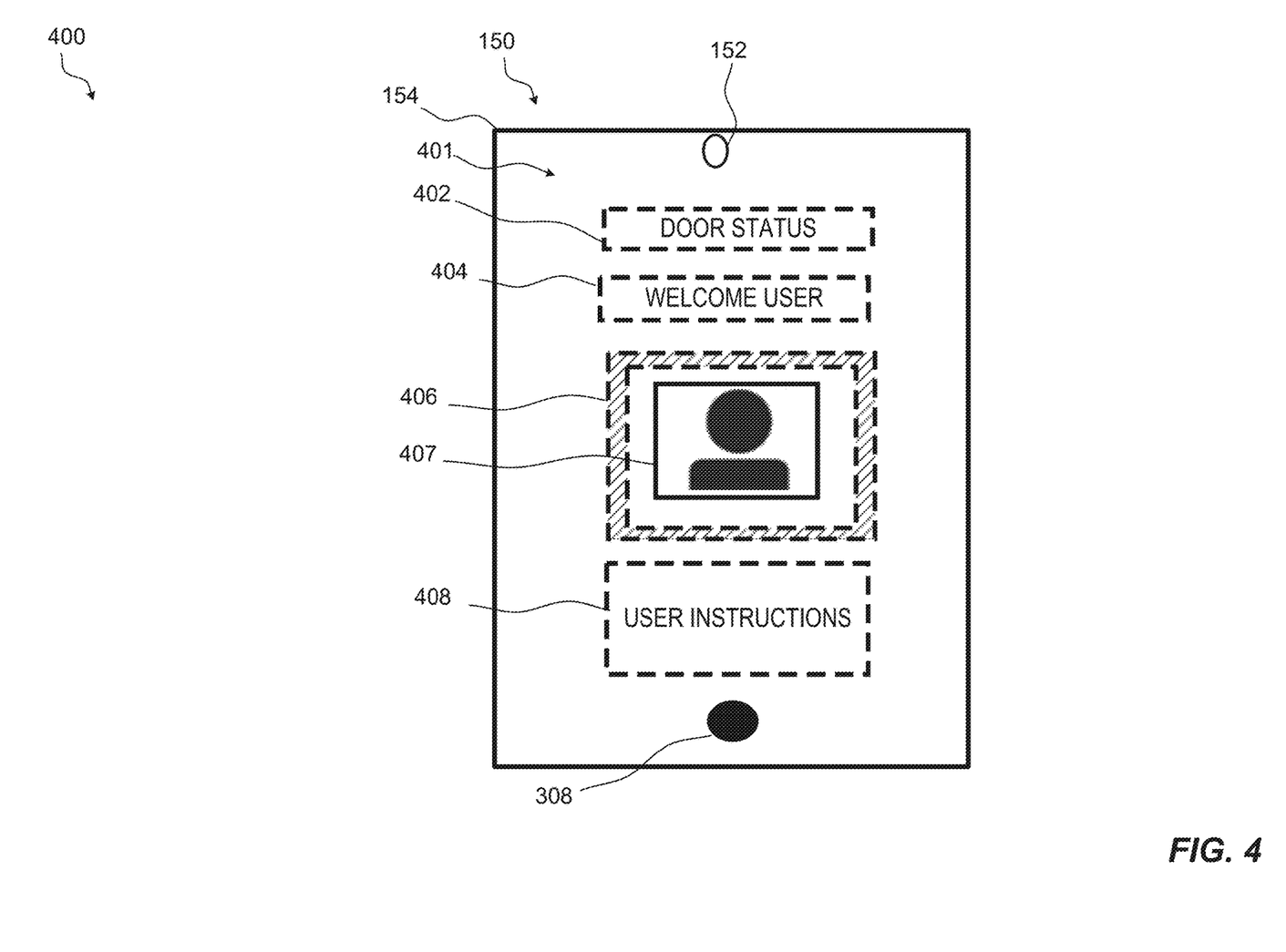
FIG. 4 is a diagram of the user interface device displaying a first information when a user identification is an authorized user or a visitor.

Referring to FIG. 4, diagram 400 shows the user interface device 150 (as described above with reference to FIGS. 1-3) displaying a graphical user interface 401. The graphical user interface 401 displays a first information when a user identification is an authorized user or a visitor, the graphical user interface 401 includes a door status message 402 (indicating a status of the door 201, e.g., whether the door 201 is in a locked state or an unlocked state). In one example, the door status message 402 may be color coded, e.g., red color to represent a locked state and a green color to represent the unlocked state. The graphical user interface 401 also includes a welcome message 404 welcoming the user (e.g., when access is granted to the user) or the visitor, an image 406 (e.g., a photo 407 of the user or the visitor captured by the user identification device 152, or a picture of the user stored in the data storage 108), user instructions 408, and an input interface 308 (e.g., a touch button, an alpha-numeric keypad, etc.). The user instructions 408 may provide instructions for the user or the visitor to provide input through the input interface 308. In some examples, the user instructions 408 may include non-sensitive data tailored to the user or the visitor. For example, the user instructions 408 may include a reminder for an upcoming meeting, or a general greeting. In some examples, the welcome message may include environmental data such as room temperature, humidity, and occupancy count. In some examples, in the event of an emergency evacuation, the graphical user interface 401 may illuminate a color (e.g., green) indicating the door 201 to be an emergency door.

Figure 5:
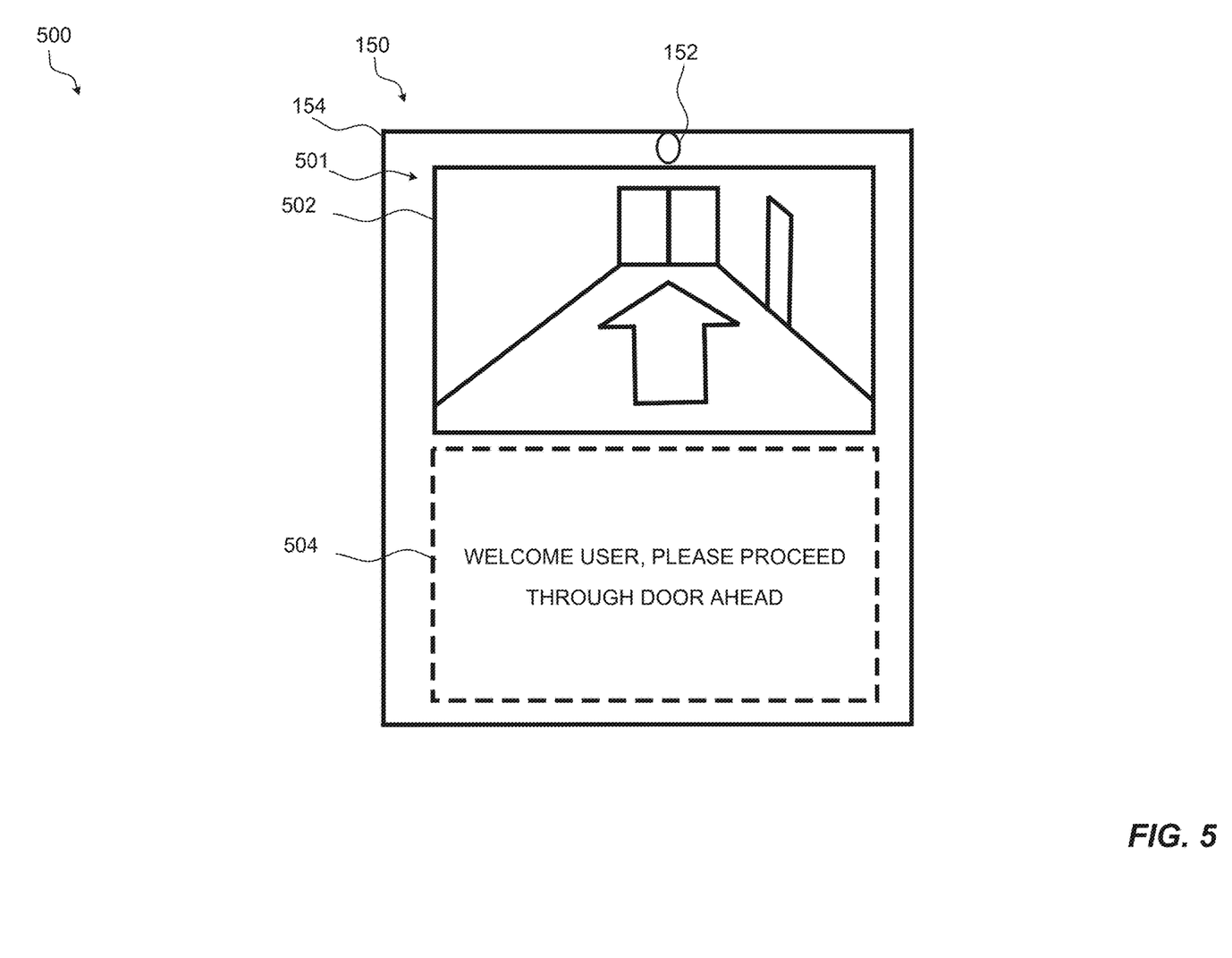
FIG. 5 is a diagram of the user interface device displaying a second information when a user identification is an authorized user.

Referring to FIG. 5, diagram 500 shows the user interface device 150 (as described above with reference to FIGS. 1-3) displaying a graphical user interface 501. The graphical user interface 501 displays a second information when a user identification is an authorized user, the graphical user interface 501 includes a navigation region 502 for guiding the user, and an instruction region 504 for displaying step by step (e.g., turn by turn directions) for the user. For example, based on an identification of the user and user input received at the input interface 308, the navigation region 502 and the instruction region 504 may provide navigation to the user (e.g., based on a destination entered by the user, or the destination location for an upcoming meeting for the user). In some examples, one or more audio output devices at the user interface device 150 can provide audio navigation instructions to the user. For example, the user may select a destination (e.g., Research and Development department) at the graphical user interface 401 and the graphical user interface 501 may display a pictorial sign (similar to satellite navigation in a car) in the navigation region 502 and a short description to navigate the user to the desired destination in the instruction region 504.

Figure 6:
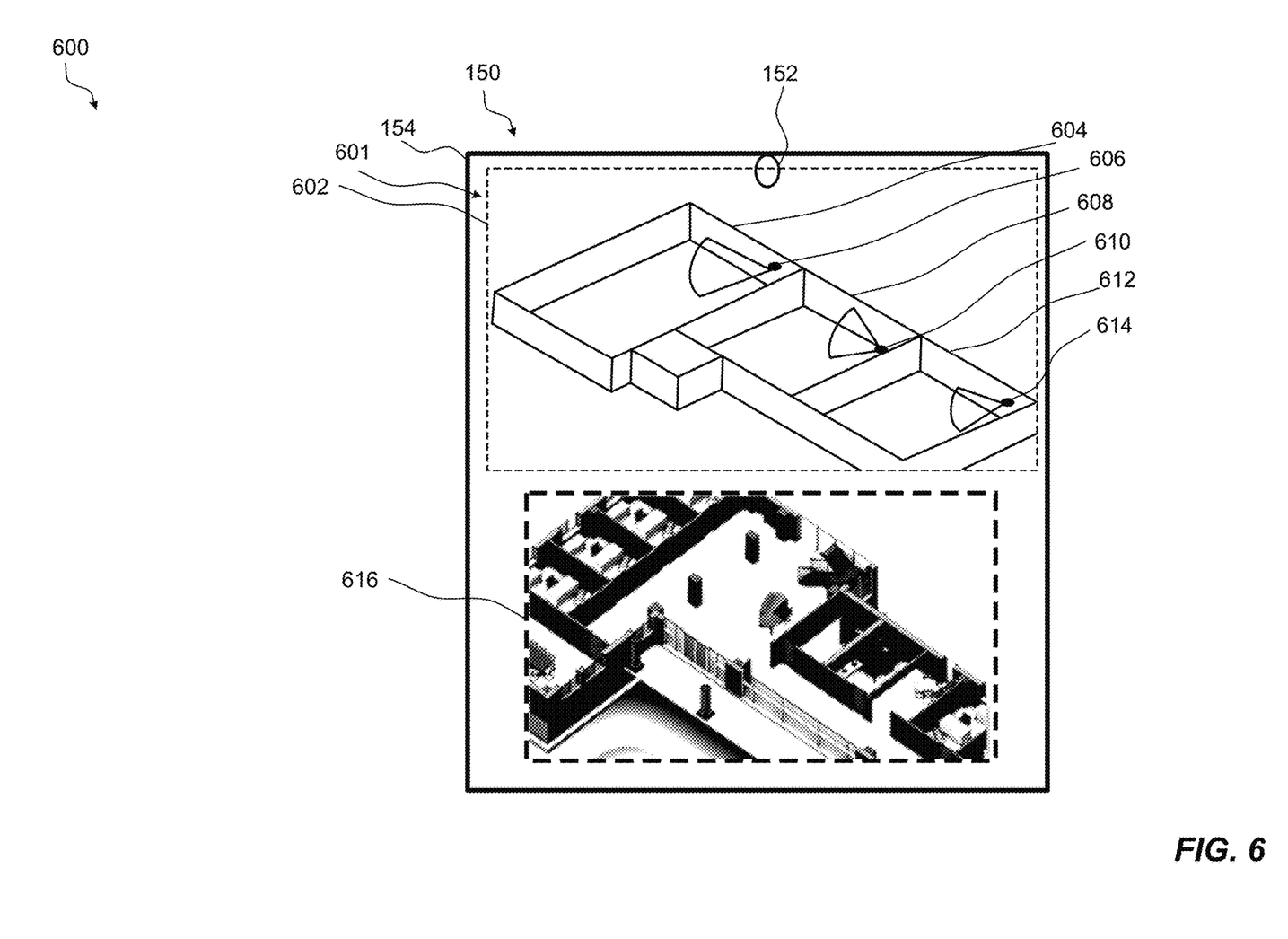
FIG. 6 is a diagram of the user interface device displaying a first information and a second information when a user identification is a security personnel.

Referring to FIG. 6, diagram 600 shows the user interface device 150 (as described above with reference to FIGS. 1-3) displaying a graphical user interface 601. The graphical user interface 601 displays a first information when a user identification is a security personnel, the graphical user interface 601 may include a three-dimensional model 602 of the area including a plurality of graphical user interfaces 604, 608 and 612, and a display area 616. The graphical user interfaces 604, 608 and 612 include representations of security cameras 606, 610 and 614, respectively. The user (identified as the security management personnel) may select one of the security cameras 606, 610 and 614 and based on the user selection, the display area 616 may display a video stream corresponding to the selected security camera. In one example, the graphical user interface 602 may include a building information modeling (BIM) model of the area, and each of the graphical user interfaces 604, 608 and 612 may represent an access controlled entrance. The user (identified as the security management personnel) may select one of the graphical user interfaces 604, 608 and 612, and based on the user selection, the display area 616 may display a status of the selected access controlled entrance, The graphical user interface 602 may allow the user (identified as the security management personnel) to configure the access controlled entrance. The graphical user interface 601 may allow the user to access the BIM (Building Information Model) of a floor level or a section of the area to investigate the area prior to entering the premises of the floor level or the section of the area.

In one example, the user interface device 150 may provide capabilities of a 'smart peephole' (e.g., a live video feed of a closed circuit television camera (CCTV) by selecting a security camera (from one of the security cameras 606, 610 and 614, as described above). In the event of a security breach, the graphical user interface 601 may also display flashing red lights at the boundaries of the graphical user interface 602 to notify the user (i.e., the security personnel). The graphical user interface 601 may allow the security personnel to lock/secure one or more entrances, call police, raise alarms, etc. on monitoring suspicious activity using the 'smart peephole'. In some examples, depicting the BIM in the graphical user interface 602 may inform the user of the topology of one or rooms and their inter-relationships (e.g., connection paths between the respective rooms) in the area.

Figure 7:
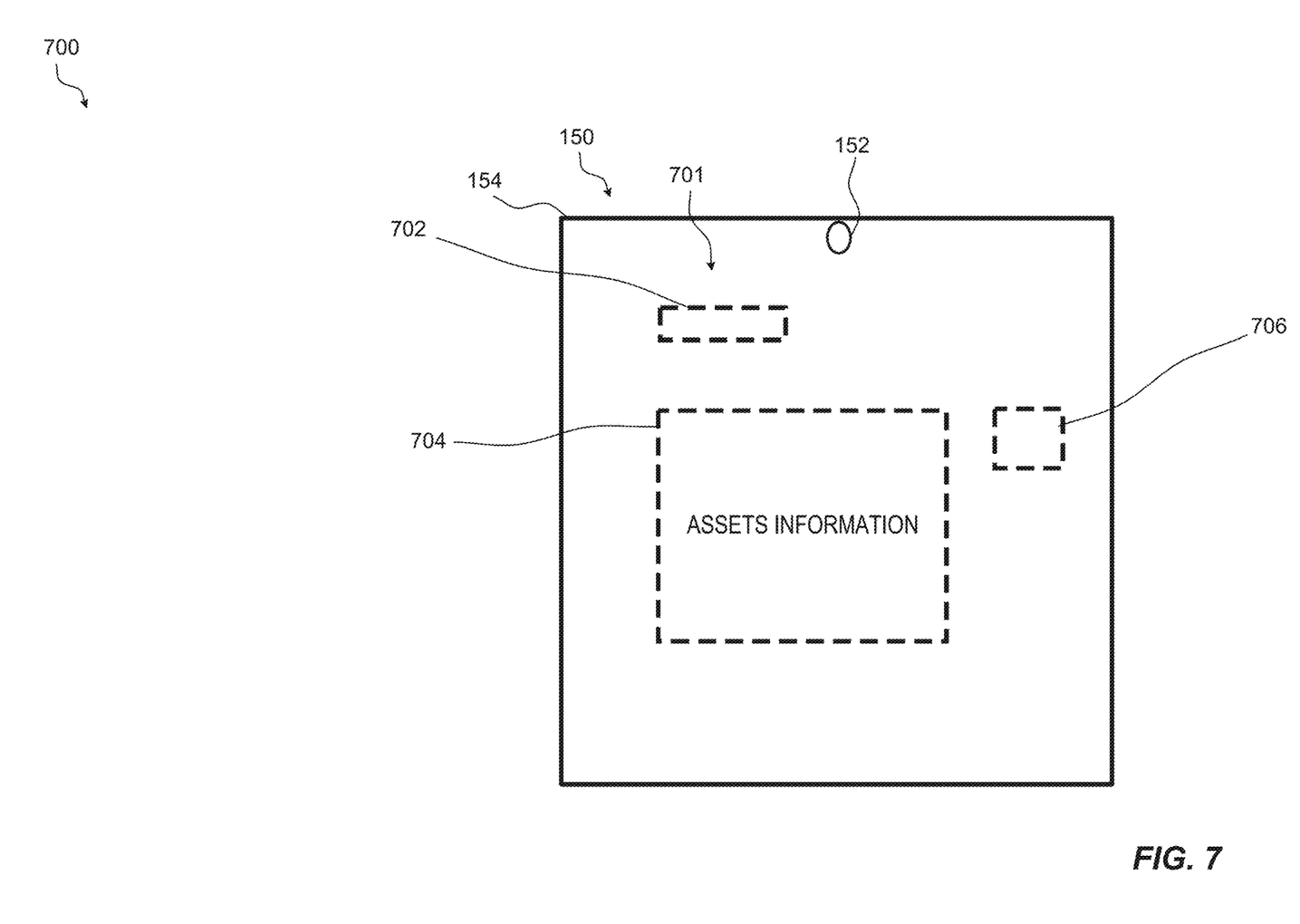
FIG. 7 is a diagram of the user interface device displaying a first information when a user identification is a building management personnel.
Figure 8:
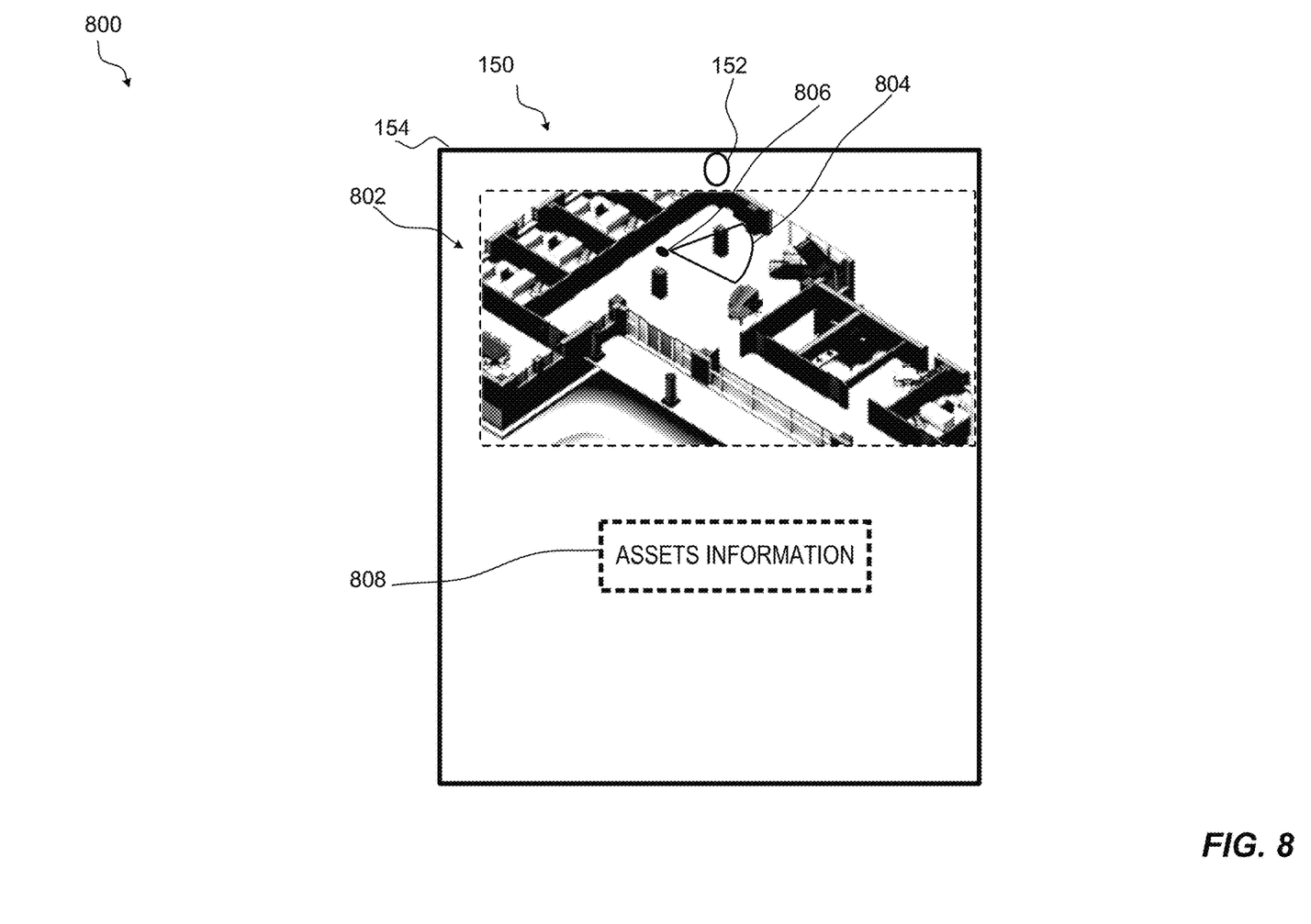
FIG. 8 is a diagram of the user interface device displaying a second information when a user identification is a building management personnel.

Referring to FIGS. 7 and 8, diagram 700 (FIG. 7) shows the user interface device 150 (as described above with reference to FIGS. 1-3) displaying a graphical user interface 701. The graphical user interface 701 displays a first information when a user identification is a building management personnel, the graphical user interface 701 may include an interactive image floorplan including a plurality of graphical user interfaces 702 and 706 representing each of a plurality of devices in the area. The graphical user interface 701 also includes an assets information area 704 to display details pertaining to one or more of the plurality of devices in the area. For example, the asset information area may displays assets requiring service within the area. In one example, in the event of a fire detection and asset malfunction, the graphical user interface 701 may include a BIM map depicting all the assets within the area. The assets information area 704 may include a list of faulty assets and the graphical user interfaces 702, 706 and the assets information area 704 may allow a building management personnel to quickly navigated to the location of the faulty asset within the area. Also, the assets information area 704 may displays relevant data assigned to each device (or asset) within the area such as an internet protocol (IP) address of the device, an asset tag, a planned service routine and/or an immediate requirement for service. In one example, a user input from the user (identified as the building management personnel) comprises a selection of one of the plurality of devices (e.g., by a touch on one of the graphical user interfaces 702 and 706).

On receiving a user input the graphical user interface 701 may change to the graphical user interface 802, as shown in diagram 800 (FIG. 8), to display second information included detailed attributes of the selected device. The graphical user interface 802 includes an asset 806, a region 804 related to the asset 806, and an assets information area 808. In one example, the asset 806 may be a camera and the region 804 may be the region in view of the camera 806. The assets information area 808 may include details of the camera 806, for example, the IP address of the camera 806, the asset tag for the camera 806, a planned service routine for the camera 806 and/or any malfunction/issues with the camera 806. In one example, in event of the malfunction of the camera 806, the graphical user interface 802 may allow the user (identified as the building management personnel) to navigate to the location of the faulty asset within the area. For example, the graphical user interface 802 may provide turn by turn directions to the user (building management personnel) to navigated to the location of the camera 806. The graphical user interface 802 may also allow accessing multi-vendor device lists to view assets tag and planned or required service for the selected asset at the graphical user interface 701.

Figure 9:
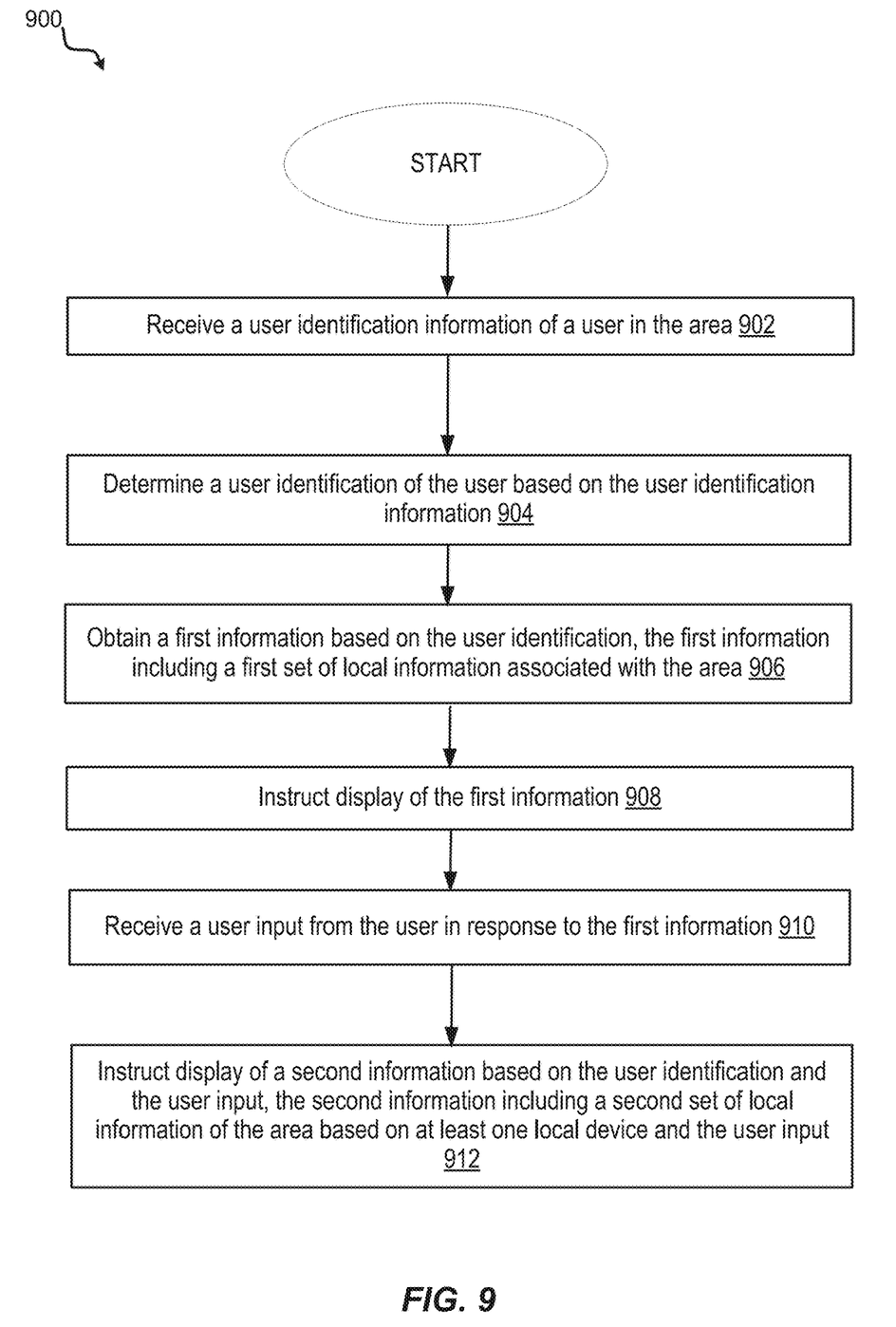
FIG. 9 is flow diagram of an example method of operation for managing and communicating local information of an area.

Referring to FIG. 9, in operation, the management server 111 (as described above with reference to FIGS. 1-8) may perform a method 900 for managing and communicating local information of an area, such as via execution of the application services unit 112 by a processor and/or a memory of the management server 111.

At block 902, the method 900 includes receiving a user identification information of a user in the area. For example, in an aspect, the application services unit 112 and/or the processor 101 may receive a user identification information of the user in the area. In one implementation, the processor 101 executes instructions stored in the data analytics unit 110 to receive an image captured by the user identification device 152. In another implementation, the processor 101 may execute instructions stored in the data analytics unit 110 to receive an alphanumeric code, a voice input, a barcode, or an RFID input from the user identification device 152.

At block 904, the method 900 includes determining a user identification of the user based on the user identification information. For example, in an aspect, the data analytics unit 110 and/or the processor 101 may determine a user identification of the user based on the user identification information. In one implementation, the processor 101 may execute instructions stored in the data analytics unit 110 to compare the user identification information received at block 902 to identification information stored in the data store 108. For example, the processor 101 may execute instructions stored in the data analytics unit 110 to compare image/voice/alphanumeric code/RFID input to corresponding data stored in the data store 108. Upon a successful match of the user identification information, the processor 101 may determine the user as a visitor, an authorized user, a security personnel, or a building management personnel (as described above with reference to FIGS. 4-8).

At block 906, the method 900 includes obtaining a first information based on the user identification, the first information including a first set of local information associated with the area. For example, in an aspect, the processor 101 and/or the application services unit 112 and/or the memory 103 may obtain the first information based on the user identification. In one implementation, the processor 101 may execute instructions stored in the application services unit 112 to obtain the first information as the graphical user interface 401, or the graphical user interface 601, or the graphical user interface 701 (as described above with reference to FIGS. 4, 6 and 7, respectively).

At block 908, the method 900 includes instructing display of the first information. For example, in an aspect, the processor 101, the memory 103 and/or the application services unit 112, may instruct display of the first information on the touchscreen 154 of the user interface device 150. In one implementation, the processor 101 may execute instructions stored in the application services unit 112 to display the first information as the graphical user interface 401, or the graphical user interface 601, or the graphical user interface 701 on the touchscreen 154 of the user interface device 150.

At block 910, the method 900 includes receiving a user input from the user in response to the first information. For example, in an aspect, the processor 101, the memory 103 and/or the application services unit 112 may receive a user input from the user in response to the first information. In one implementation, the processor 101 may execute instructions stored in the application services unit 112 to receive the input from the user as a touch on the input interface 308, the graphical user interface 602, or the graphical user interfaces 702/706, or the graphical user interface 802 (as described above with reference to FIGS. 3, 4, 6 and 8).

At block 912, the method 900 includes instructing display of a second information based on the user identification and the user input, the second information including a second set of local information of the area based on at least one local device and the user input. For example, in an aspect, the processor 101, the memory 103 and/or the application services unit 112 may instruct display of the second information. In one implementation, the processor 101 may execute instructions stored in the application services unit 112 to instruct display of the graphical user interface 501, the display area 616, or the graphical user interface 802 (as described above with reference to FIGS. 5, 6 and 8), on the touchscreen 154 of the user interface device 150.

Figure 10:
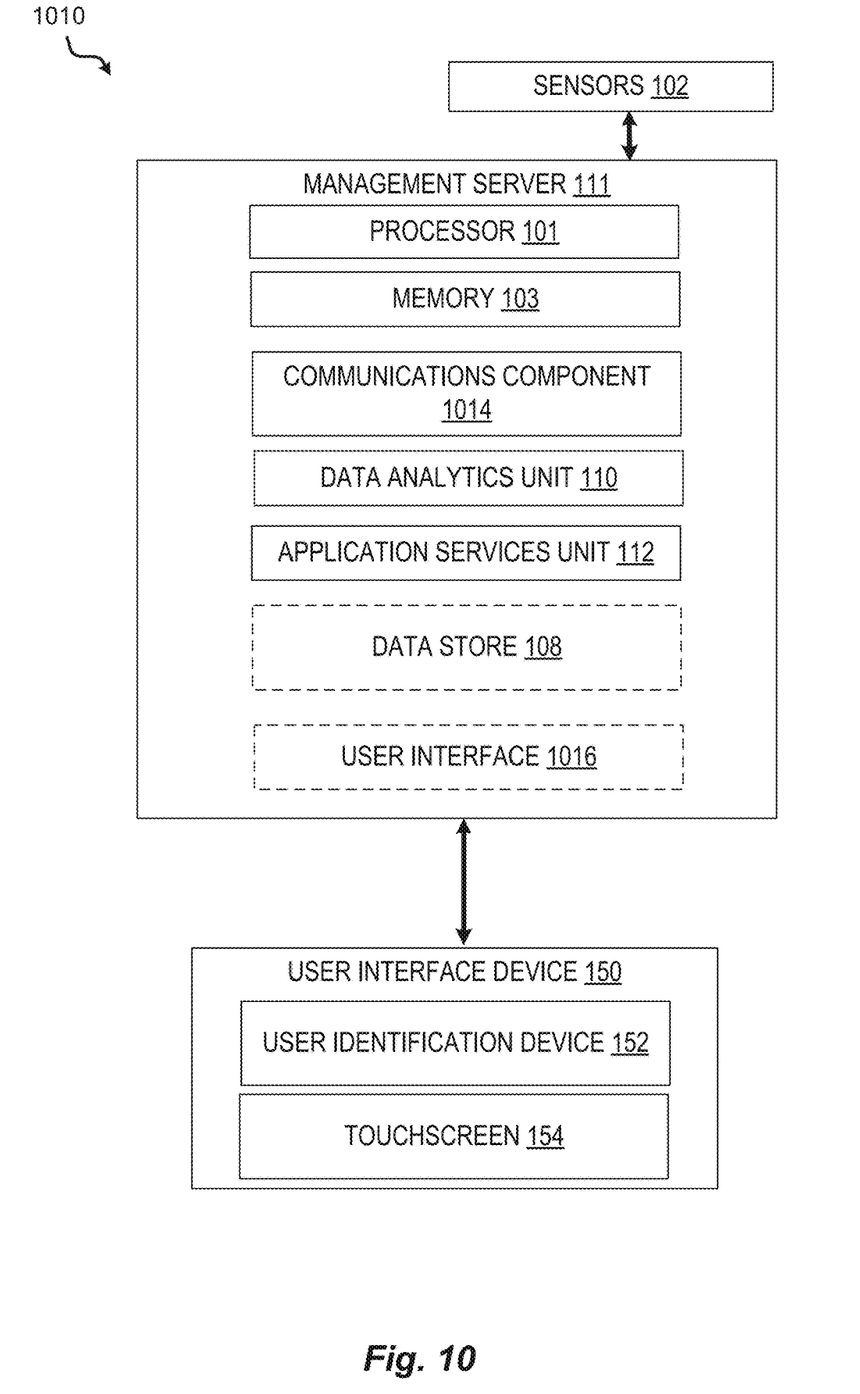
FIG. 10 is a system diagram of an example computer system operable to managing and communicating local information of an area.

Referring to FIG. 10, a computer system 1010 for managing and communicating local information of an area includes a more detailed example of the management server 111 including a number of components configured to perform the functions described herein. As previously mentioned, management server 111 includes one or more processors, such as processor 101, and one or more memories, such as memory 103, configured to execute instructions stored in the application services unit 112 and the data analytics unit 110 (as described above with reference to FIG. 1). The processor 101 is connected to a communications component 1014 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

The management server 111 may optionally include a user interface 1016 that may allow a user to configure or customize one or more components of the management server 111. The management server 111 also includes memory 103, which may be a main memory, preferably random access memory (RAM), and may optionally include a data store 108 (as described above with reference to FIG. 1). The management server 111 may include a secondary memory, for example, a hard disk drive, and/or a removable storage drive representing a floppy disk drive, a magnetic tape drive, an optical disk drive, a universal serial bus (USB) flash drive, etc. The removable storage drive reads from and/or writes to a removable storage unit in a well-known manner. Removable storage unit may represent a floppy disk, magnetic tape, optical disk, USB flash drive, a solid state drive, etc., which is read by and written to the removable storage drive. As will be appreciated, the removable storage unit may include a computer usable storage medium having stored therein computer software and/or data to perform one or more operations as described above with reference to FIGS. 1-9.

The management server 111 may be coupled to one or more sensors 102 (as described above with reference to FIG. 1) to receive measurement of one or more parameters for the area. The management server 111 may also be coupled to the user interface device 150 having the user identification device 152 and the touchscreen 154 (as described above with reference to FIGS. 1-8).

In this document, the terms "computer program medium" and "computer usable medium" are used to refer generally to non-transitory computer-readable media stored on a non-transitory memory device, which may include devices such as a removable storage unit and a hard disk installed in a hard disk drive in the management server 111. These computer program products provide software to the management server 111. Aspects of the present disclosure are directed to such computer program products. Computer programs (also referred to as computer control logic) are stored in memory 103 and/or secondary memory. Such computer programs, when executed, enable the management server 111 to perform the features in accordance with aspects of the present disclosure, as discussed herein. In particular, the computer programs, when executed, enable the processor 101 to perform the features in accordance with aspects of the present disclosure. Accordingly, such computer programs represent controllers of the management server 111.

In an aspect of the present disclosure where the disclosure is implemented using software, the software may be stored in a computer program product and loaded into management server 111 using removable storage drive, hard drive, or the communications component 1014. The control logic (software), when executed by the processor 101, causes the processor 101 to perform the functions described herein. In another aspect of the present disclosure, the system is implemented primarily in hardware using, for example, hardware components, such as application specific integrated circuits (ASICs). Implementation of the hardware state machine so as to perform the functions described herein will be apparent to persons skilled in the relevant art(s).

As used herein, an element or step recited in the singular and proceeded with the word "a" or "an" should be understood as not excluding plural elements or steps, unless such exclusion is explicitly recited. Furthermore, references to "one embodiment" are not intended to be interpreted as excluding the existence of additional embodiments that also incorporate the recited features.

The various embodiments or components described above, for example, the alarm panel, the central monitoring station, the computer system, and the components or processors therein, may be implemented as part of one or more computer systems. Such a computer system may include a computer, an input device, a display unit and an interface, for example, for accessing the Internet. The computer may include a microprocessor. The microprocessor may be connected to a communication bus. The computer may also include memories. The memories may include Random Access Memory (RAM) and Read Only Memory (ROM). The computer system further may include a storage device, which may be a hard disk drive or a removable storage drive such as a floppy disk drive, optical disk drive, and the like. The storage device may also be other similar means for loading computer programs or other instructions into the computer system. As used herein, the term "software" includes any computer program stored in memory for execution by a computer, such memory including RAM memory, ROM memory, EPROM memory, EEPROM memory, and non-volatile RAM (NVRAM) memory. The above memory types are exemplary only, and are thus not limiting as to the types of memory usable for storage of a computer program.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A computer-implemented method of managing and communicating local information of an area, comprising:
   receiving a user identification information of a user in the area;
   determining, at a processor, a user identification of the user based on the user identification information;
   obtaining, by the processor, a first information based on the user identification, wherein the first information comprises a first set of local information associated with the area;
   instructing, by the processor, display of the first information;
   receiving a user input from the user in response to the first information; and
   instructing display of a second information based on the user identification and the user input, wherein the second information comprises a second set of local information of the area based on at least one local device and the user input.

2. The computer-implemented method of claim 1, wherein the user identification information comprises one or a combination of an electronic identification information and a biometric identification information, and wherein the user identification comprises one of:
   a visitor;
   an authorized user;
   a security personnel; or
   a building management personnel.

3. The computer-implemented method of claim 2, wherein the user identification is the visitor, and the first information comprises a welcome message and directions for the visitor.

4. The computer-implemented method of claim 3, further comprising:
   sending, from a management server, visitor information to authorized personnel of the area.

5. The computer-implemented method of claim 2, wherein the user identification is the authorized user, and the first information comprises one or more of a door status indication, a user authentication indication, a welcome message, a username, a user photo, or a user specific instruction.

6. The computer-implemented method of claim 5, wherein the user input comprises a selection of additional information that is based on the first information, wherein the additional information comprises one or a combination of:
   detailed information of a subset of the area based on the selection;
   directional information of the subset of the area based on the selection;
   location of the subset of the area relative to the user; or
   environmental data of the subset of the area including one or more of temperature, humidity, or occupancy count.

7. The computer-implemented method of claim 2, wherein the user identification is the security personnel, and the first information comprises a three-dimensional model of the area including a plurality of graphical user interfaces representing each of a plurality of security cameras, wherein the user input comprises a selection of one of the plurality of security cameras, and wherein displaying the second information comprises displaying a video stream from the one of the plurality of security cameras.

8. The computer-implemented method of claim 2, wherein the user identification is the security personnel, and the first information comprises a building information modeling (BIM) model of the area including a plurality of graphical user interfaces representing each of a plurality of access controlled entrances, wherein the user input comprises a selection and configuration of one of the plurality of access controlled entrances, and wherein displaying the second information comprises displaying a status of the one of the plurality of access controlled entrances.

9. The computer-implemented method of claim 2, wherein the user identification is the building management personnel and the first information comprises an interactive image floorplan including a plurality of graphical user interfaces representing each of a plurality of devices, wherein the user input comprises a selection of one of the plurality of devices, and the second information comprises detailed attributes of the one of the plurality of devices.

10. The computer-implemented method of claim 9, wherein the first information further comprises an indication of fault of one or more of the plurality of devices.

11. A computer system for managing and communicating local information of an area, comprising:
    a management server comprising:
        a memory; and
        a processor in communication with the memory and configured to:
            determine a user identification of a user based on user identification information;

obtain a first information based on the user identification, wherein the first information comprises a first set of local information associated with the area;

instruct display of the first information; and instruct display of a second information based on the user identification and a user input, wherein the second information comprises the local information of the area based on at least one local device and the user input.

12. The computer system of claim 11, further comprising:
a user interface device comprising a user identification device and a touchscreen mounted adjacent to the area, the user interface device in communication with the management server, the user identification device configured to:
receive the user identification information of the user in the area; and
receive the user input from the user in response to the first information.

13. The computer system of claim 12, wherein the user identification information comprises one or a combination of an electronic identification information and a biometric identification information, and wherein the user identification comprises one of:
a visitor;
an authorized user;
a security personnel; or
a building management personnel.

14. The computer system of claim 13, wherein the user identification is the visitor, and the first information comprises a welcome message and directions for the visitor.

15. The computer system of claim 14, wherein the processor is further configured to: send visitor information to authorized personnel of the area.

16. The computer system of claim 13, wherein the user identification is the authorized user, and the first information comprises one or more of a door status indication, a user authentication indication, a welcome message, a username, a user photo, or a user specific instruction.

17. The computer system of claim 16, wherein the user input comprises a selection of additional information that is based on the first information, wherein the additional information comprises one or a combination of:
detailed information of a subset of the area based on the selection;
directional information of the subset of the area based on the selection;
location of the subset of the area relative to the user; or
environmental data of the subset of the area including one or more of temperature, humidity, or occupancy count.

18. The computer system of claim 13, wherein the user identification is the security personnel, and the first information comprises a three-dimensional model of the area including a plurality of graphical user interfaces representing each of a plurality of security cameras, wherein the user input comprises a selection of one of the plurality of security cameras, and wherein displaying the second information comprises displaying a video stream from the one of the plurality of security cameras.

19. The computer system of claim 13, wherein the user identification is the security personnel, and the first information comprises a building information modeling (BIM) model of the area including a plurality of graphical user interfaces representing each of a plurality of access controlled entrances, wherein the user input comprises a selection and configuration of one of the plurality of access controlled entrances, and wherein displaying the second information comprises displaying a status of the one of the plurality of access controlled entrances.

20. The computer system of claim 13, wherein the user identification is the building management personnel and the first information comprises an interactive image floorplan including a plurality of graphical user interfaces representing each of a plurality of devices, wherein the user input comprises a selection of one of the plurality of devices, and the second information comprises detailed attributes of the one of the plurality of devices.

21. The computer system of claim 20, wherein the first information further comprises an indication of fault of one or more of the plurality of devices.

22. The computer system of claim 11, wherein the at least one local device comprises at least one sensor in communication with the management server.

23. A computer-readable medium storing instructions for managing and communicating local information of an area, executable by a processor to:
receive a user identification information of a user in the area;
determine a user identification of the user based on the user identification information;
obtain a first information based on the user identification, wherein the first information comprises a first set of local information associated with the area;
instruct display of the first information;
receive a user input from the user in response to the first information; and
instruct display of a second information based on the user identification and the user input, wherein the second information comprises a second set of local information of the area based on at least one local device and the user input.

* * * * *